US009286817B2

(12) United States Patent
Takenaka

(10) Patent No.: US 9,286,817 B2
(45) Date of Patent: Mar. 15, 2016

(54) PICTURE REPRODUCING METHOD AND PICTURE REPRODUCING APPARATUS

(75) Inventor: Kouichi Takenaka, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 400 days.

(21) Appl. No.: 13/028,402

(22) Filed: Feb. 16, 2011

(65) Prior Publication Data

US 2011/0292185 A1 Dec. 1, 2011

(30) Foreign Application Priority Data

May 31, 2010 (JP) ................... 2010-124737
Dec. 15, 2010 (JP) ................... 2010-279777

(51) Int. Cl.
H04N 13/04 (2006.01)
G09G 3/00 (2006.01)
H04N 13/00 (2006.01)

(52) U.S. Cl.
CPC ........... *G09G 3/003* (2013.01); *H04N 13/0003* (2013.01); *H04N 13/0438* (2013.01); *H04N 13/0497* (2013.01); *G09G 2370/042* (2013.01)

(58) Field of Classification Search
CPC .................................................... H04N 13/04
USPC .......................................................... 348/51
See application file for complete search history.

(56) References Cited

U.S. PATENT DOCUMENTS 8,159,526 B2 * 4/2012 Sato et al. ........................ 348/51
8,279,339 B2 * 10/2012 Shoji .............................. 348/441
8,619,042 B2 * 12/2013 Taniuchi ....................... 345/173
8,675,054 B2 * 3/2014 Jung ..................... G09G 3/3648 348/42
2002/0163490 A1 * 11/2002 Nose ............................... 345/89
2002/0180906 A1 * 12/2002 Divelbiss et al. ............. 349/104
2006/0061652 A1 * 3/2006 Sato et al. ....................... 348/53
2006/0164380 A1 * 7/2006 Yang et al. .................... 345/103

(Continued)

FOREIGN PATENT DOCUMENTS

JP 2002-95018 3/2002
JP 2005-25122 1/2005

(Continued)

OTHER PUBLICATIONS

European Search Report dated Dec. 3, 2012, from corresponding European Application No. 11003019.4.

(Continued)

Primary Examiner — Dave Czekaj
Assistant Examiner — Kehinde O Abimbola
(74) Attorney, Agent, or Firm — Katten Muchin Rosenman LLP

(57) ABSTRACT

A picture-dimensionality check unit checks whether or not a picture to be reproduced is a three-dimensional picture containing a first parallax image and a second parallax image, which are images of an object from different points of view in a three-dimensional space. A display panel check unit configured acquires, from a display apparatus by which the picture is displayed on a display panel, information including the type of the display panel on the condition that the picture to be reproduced is a three-dimensional picture. A picture adjusting unit retrieves from a database a picture output condition that provides suitable display of the picture on the display panel, on the basis of the information acquired by the display panel check unit, and to adjust the picture in accordance with the retrieved picture output condition.

9 Claims, 12 Drawing Sheets

(56) References Cited

U.S. PATENT DOCUMENTS

| | | | |
|---|---|---|---|
| 2006/0203335 A1* | 9/2006 | Martin et al. | 359/462 |
| 2008/0079805 A1* | 4/2008 | Takagi et al. | 348/51 |
| 2008/0117231 A1* | 5/2008 | Kimpe | G09G 3/20 345/629 |
| 2008/0158486 A1* | 7/2008 | Kim | G02F 1/133555 349/106 |
| 2008/0165107 A1* | 7/2008 | Yang et al. | 345/89 |
| 2009/0002578 A1* | 1/2009 | Araki et al. | 349/8 |
| 2009/0016639 A1* | 1/2009 | Ueda | G06K 9/40 382/275 |
| 2009/0080789 A1* | 3/2009 | Shoji | 382/254 |
| 2009/0103026 A1* | 4/2009 | Yang et al. | 349/114 |
| 2009/0135149 A1* | 5/2009 | Taniuchi | 345/173 |
| 2010/0039504 A1 | 2/2010 | Takahashi et al. | |
| 2010/0091368 A1* | 4/2010 | Kim et al. | 359/465 |
| 2010/0189413 A1* | 7/2010 | Yoshino | 386/83 |
| 2010/0201783 A1* | 8/2010 | Ueda | G02B 27/2228 348/46 |
| 2010/0238274 A1* | 9/2010 | Kim | H04N 13/0018 348/51 |
| 2011/0137727 A1* | 6/2011 | Chung et al. | 705/14.55 |
| 2011/0169821 A1* | 7/2011 | Ishiguchi | 345/419 |
| 2011/0216172 A1* | 9/2011 | Kerofsky | 348/53 |
| 2011/0279659 A1* | 11/2011 | Jung | G09G 3/3648 348/54 |

FOREIGN PATENT DOCUMENTS

| | | |
|---|---|---|
| JP | 2008-67024 | 3/2008 |
| JP | 2009-58684 | 3/2009 |
| JP | 2010-45584 | 2/2010 |

OTHER PUBLICATIONS

Notification of Reason(s) for Refusal dated Jun. 19, 2012, from corresponding Japanese Application No. 2010-279777.

European Search Report dated Aug. 10, 2012, from corresponding European Application No. 11003019.4.

Andrew Woods. "Understanding Crosstalk in Stereoscopic Displays" Proc. 3-DSA Conf. Tokyo, Japan. May 19, 2010, retrieved from https://cmst.curtin.edu.au/local/docs/pubs/2010-23_understanding_crosstalk_woods.pdf.

Janusz Konrad, et al. "Cancellation of Image Crosstalk in Time-Sequential Displays of Stereoscopic Video" IEEE Transactions on Image Processing, vol. 9, No. 5, May 1, 2000.

Andrew Woods, et al. "Characterising Sources of Ghosting in Time-Sequential Stereoscopic Video Displays" Proceedings of the SPIE—The International Society for Optical Engineering SPIE—Int. Soc. Opt., vol. 4660, 2002, pp. 66-77.

* cited by examiner

FIG. 9

| | | DISPLAY DEVICE | | | | |
|---|---|---|---|---|---|---|
| DEVICE TYPE | | LIQUID CRYSTAL | | | | PLASMA OR OTHERS |
| DISPLAY METHOD | | NORMALLY WHITE | NORMALLY BLACK | | MICROPOL | |
| | | | BLACK INSERTION | FRAME REPETITION | | |
| LUMINANCE RANGE | MINIMUM | 0 | | 25 | 0 | 0 |
| | MAXIMUM | 235 | | 255 | 255 | 255 |
| STANDARD GRADATION (γ) | | 2.0 | | 2.0 | 2.2 | 2.2 |
| OFFSET | | 0 | | 10 | 0 | 0 |
| CHARACTER COLOR | R | 239 | | 255 | 255 | 255 |
| | G | 235 | | 255 | 255 | 255 |
| | B | 224 | | 255 | 255 | 255 |
| BACKGROUND COLOR | R | 0 | | 16 | 0 | 0 |
| | G | 0 | | 32 | 0 | 0 |
| | B | 0 | | 64 | 0 | 0 |
| SMOOTHING PROCESS | | NO | | NO | YES | NO |

FIG.10

```
SETTING ITEM:"3D OUTPUT - DISPLAY RANGE SETTING"
OPTIONS:
        — "RIGHTER +3"
        — "RIGHTER +2"
        — "RIGHTER +1"
        — "STANDARD (FULL RANGE)"
        — "DARKER -1"
        — "DARKER -2"
        — "DARKER -1"
NOTE:
      SET THE RANGE OF LUMINANCE
      VALUE OF 3D PICTURES
```

FIG.11

```
  SETTING ITEM:"3D OUTPUT - GRADATION SETTING"
"GAMMA CORRECTION VALUE   1.0~3.5(STANDARD:2.2)
 FOR 3D OUTPUT"
"GRADATION OFFSET VALUE   0~255
 FOR 3D OUTPUT"

NOTE:
     SET THE GRADATION CURVE FOR 3D PICTURES
```

FIG.12

```
SETTING ITEM:  "3D OUTPUT - SMOOTHING PROCESS FOR MICROPOL TYPE"

"OFF" / "ON"
"level 0(OFF)" / "level 1" / "level 2"

NOTE:
     SET THE LEVEL OF SMOOTHING PROCESS FOR MICROPOL TYPE
```

PICTURE REPRODUCING METHOD AND PICTURE REPRODUCING APPARATUS

BACKGROUND OF THE INVENTION

1. Field of the Invention

The present invention relates to a picture reproducing method and a picture reproducing apparatus.

2. Description of the Related Art

Due to the enhancement in the performance of home televisions in recent years, three-dimensional (3D) televisions, which can provide three-dimensional stereoscopic pictures with depth, have become widespread. Unlike a conventional television displaying two-dimensional pictures, a 3D television provides stereoscopic pictures having depth in the front-back direction.

There are various kinds of techniques for providing stereoscopic pictures, so that there are various types of display panels for providing such pictures, accordingly. Depending on the way of providing stereoscopic pictures, a phenomenon called "crosstalk" may occur by which a picture looks as if images overlap in layers, which would give an unpleasant feeling to the viewer.

SUMMARY OF THE INVENTION

The present invention has been made in view of such a situation, and a purpose thereof is to provide a technique for reducing crosstalk that could occur on a 3D television.

To solve the problem above, one embodiment of the present invention is a picture display method. The method in which a picture to be reproduced is a three-dimensional picture containing a first parallax image and a second parallax image, which are images of an object from different points of view in a three-dimensional space, the picture reproducing method comprises: acquiring, from a display apparatus by which the three-dimensional picture is displayed on a display panel, information including the type of the display panel; retrieving from a database a picture output condition that provides suitable display of the three-dimensional picture on the display panel, on the basis of the acquired information; and displaying the three-dimensional picture in accordance with the retrieved picture output condition.

Another embodiment of the present invention is a picture reproducing apparatus. The apparatus comprises: a picture-dimensionality check unit configured to check whether or not a picture to be reproduced is a three-dimensional picture containing a first parallax image and a second parallax image, which are images of an object from different points of view in a three-dimensional space; a display panel check unit configured to acquire, from a display apparatus by which the picture is displayed on a display panel, information including the type of the display panel on the condition that the picture to be reproduced is a three-dimensional picture; and a picture adjusting unit configured to retrieve from a database a picture output condition that provides suitable display of the picture on the display panel, on the basis of the information acquired by the display panel check unit, and to adjust the picture in accordance with the retrieved picture output condition.

The picture reproducing apparatus may further comprise an output condition acquiring unit configured to retrieve one or more the picture output conditions from a database, provide on the display panel in such a manner so as to be selected, and the three-dimensional picture is displayed in accordance with the picture output condition that has been selected.

Optional combinations of the aforementioned constituting elements, and implementations of the invention in the form of methods, apparatuses, systems, recording media, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 9 is a diagram that schematically shows a data structure in an output condition storage unit;

FIG. 10 is an exemplary display for prompting selection of a luminance value range of a 3D liquid crystal television;

FIG. 11 is an exemplary display for prompting selection of gradation settings of the 3D liquid crystal television;

FIG. 12 is an exemplary display for prompting selection of the level of a smoothing process for the microPol type;

DETAILED DESCRIPTION OF THE INVENTION

The invention will now be described by reference to the preferred embodiments. This does not intend to limit the scope of the present invention, but to exemplify the invention.

[Three-dimensional Pictures Using Parallax Images]

Figure 1:
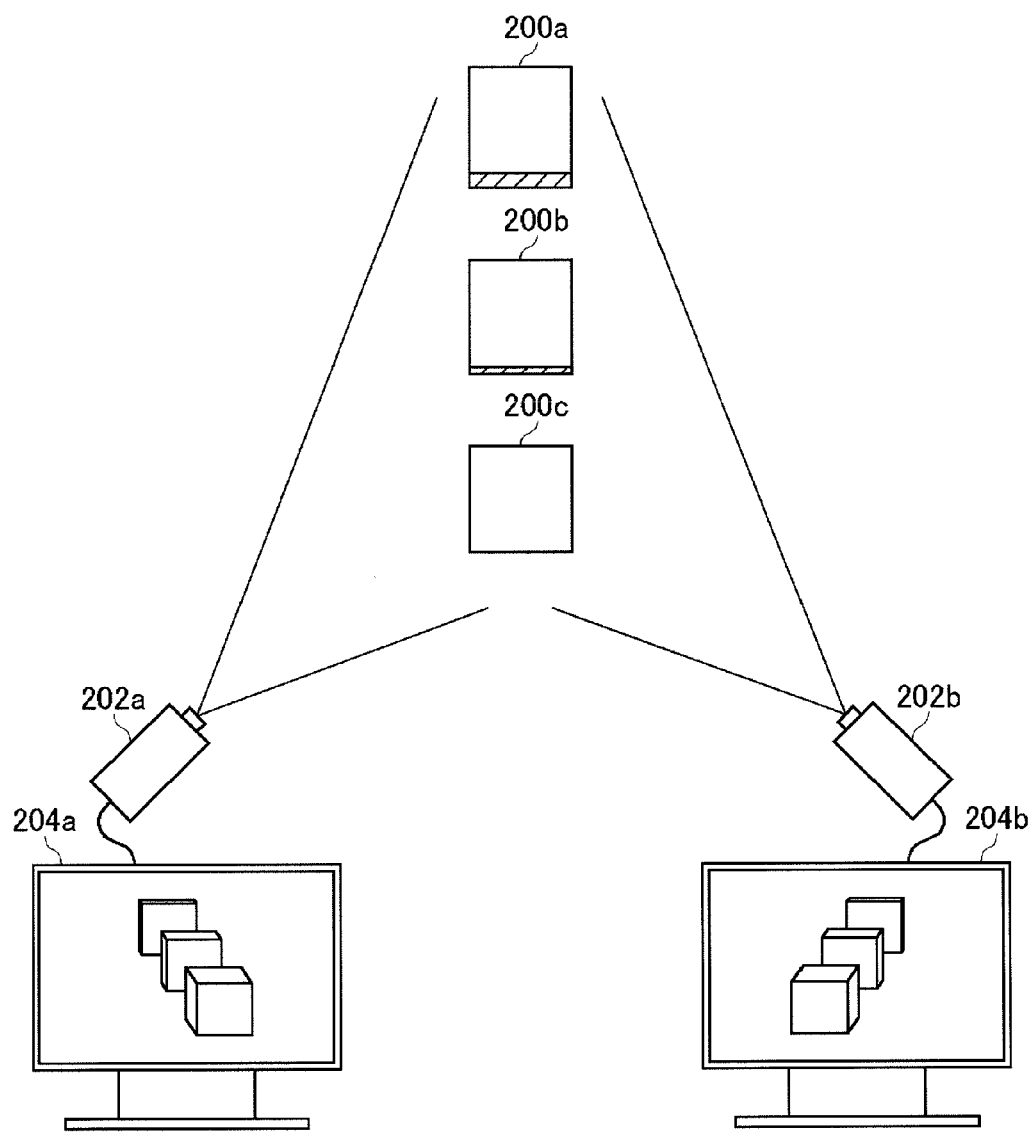
FIG. 1 is a diagram that shows the relations between objects and parallax images thereof in three-dimensional space.

FIG. 1 is a diagram that shows the relations between objects and parallax images thereof in three-dimensional space. It is assumed here that an object 200a, object 200b, and object 200c are collectively referred to as objects 200, and an image of the three objects 200 is captured in three-dimensional space by a left-eye camera 202a that captures the image of the objects 200 from the left side and a right-eye camera 202b that captures the image of the objects 200 from the right side, which are collectively referred to as cameras 202. In FIG. 1, the image of the objects 200 captured by the left-eye camera 202a and the image of the objects 200 captured by the right-eye camera 202b are displayed on a monitor 204a and a monitor 204b, respectively, which are two-dimensional monitors and collectively referred to as monitors 204.

Since the left-eye camera 202a and right-eye camera 202b capture the image of the objects 200 from different positions, the image displayed on the monitor 204a and the image displayed on the monitor 204b are different in aspect of the objects 200. Such images of the objects 200 viewed from different points of view in three-dimensional space are called "parallax images." Since the left and right eyes of a human are about six centimeters apart from each other, parallax is caused between the image viewed from the left eye and the image viewed from the right eye. It is said that the human brain recognizes the depth of an object using parallax images perceived by the left and right eyes. Accordingly, when a parallax image to be perceived by the left eye and a parallax image to be perceived by the right eye are projected into the respective eyes, a human recognizes the picture as a stereoscopic picture having depth. In the following, a "stereoscopic picture" and a "three-dimensional picture" are used interchangeably with each other in this specification.

Figure 2:
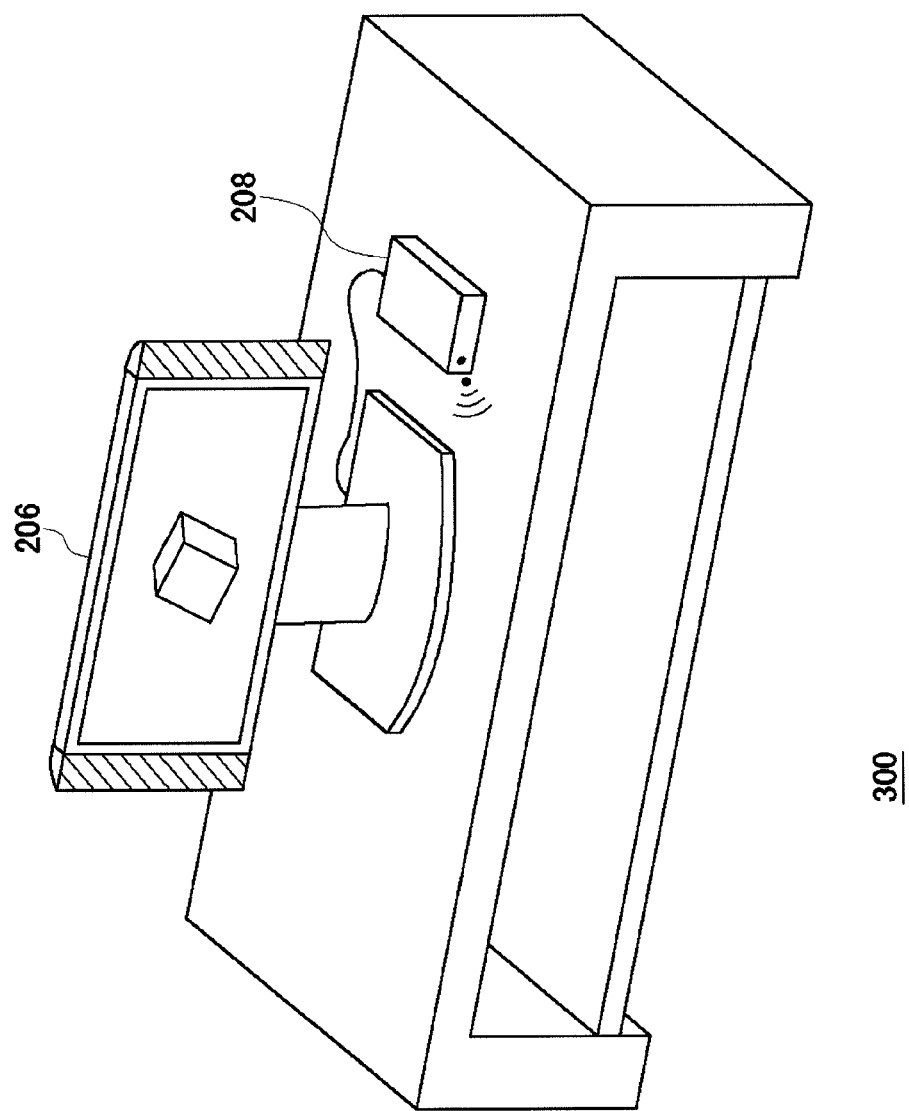
FIG. 2 is a diagram that shows an overview of a shutter-type three-dimensional (3D) picture display system using parallax images.

There are various types of 3D televisions that provide pictures with depth to humans using parallax images. As an example, there will be described a shutter-type 3D television that alternately displays parallax images for the left eye and parallax images for the right eye in a time-division manner. FIG. 2 is a diagram that shows an overview of a shutter-type 3D picture display system 300 using parallax images. The 3D picture display system 300 includes a 3D television 206 for projecting parallax images, shutter glasses 210 used to view parallax images, and a glasses drive signal transmitter 208 for synchronizing the 3D television 206 and shutter glasses 210.

The 3D television 206 alternately provides parallax images for the left eye and parallax images for the right eye in a time-division manner. The glasses drive signal transmitter 208 transmits the display timing of a parallax image on the 3D television 206 in the form of an infrared synchronization signal. The shutter glasses 210 are provided with a receiving unit (not illustrated) for receiving a synchronization signal transmitted from the glasses drive signal transmitter 208 and close the shutter of the left or right lens according to the received synchronization signal. The shutters can be implemented by using a known technique for liquid crystal shutters, for example.

More specifically, when the 3D television 206 displays a parallax image for the left eye, the shutter glasses 210 receive from the glasses drive signal transmitter 208 a signal directing that the shutter of the right eye lens be closed. When the shutter glasses 210 close the shutter of the right eye lens according to the received signal, a picture to be projected into the right eye is blocked. Accordingly, when the 3D television 206 displays a parallax image for the left eye, such a left-eye parallax image is only projected into the user's left eye. On the other hand, when the 3D television 206 displays a parallax image for the right eye, the shutter glasses 210 close the shutter of the left eye lens, so that the right-eye parallax image is only projected into the user's right eye.

Figure 3:
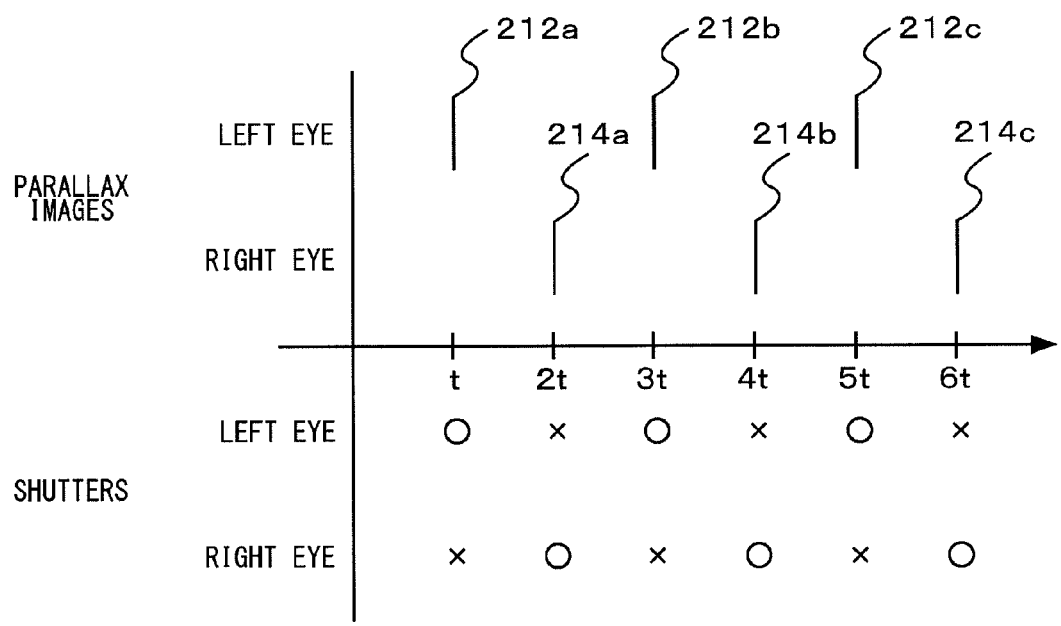
FIG. 3 is a diagram that shows the relation between the timing of controlling shutters of shutter glasses and the timing of displaying a parallax image on a 3D television.

FIG. 3 is a diagram that shows the relation between the timing of controlling shutters of the shutter glasses 210 and the timing of displaying a parallax image on the 3D television 206. The 3D television 206 alternately displays, with a predetermined period of time t (a period of 1/120 seconds, for example), left-eye parallax images 212 including a left-eye parallax image 212a, left-eye parallax image 212b, and left-eye parallax image 212c, and right-eye parallax images 214 including a right-eye parallax image 214a, right-eye parallax image 214b, and right-eye parallax image 214c.

When the left-eye parallax image 212a is displayed, the left eye shutter of the shutter glasses 210 is open while the right eye shutter thereof is closed. In FIG. 3, the symbol "o" denotes the state where a shutter of the shutter glasses 210 is open, whereas the symbol "x" denotes the state where a shutter of the shutter glasses 210 is closed. By synchronizing display of a parallax image on the 3D television 206 and opening or closing of a shutter of the shutter glasses 210 so as to project left-eye parallax images 212 into the user's left eye and right-eye parallax images 214 into the user's right eye as shown in FIG. 3, a stereoscopic picture with depth can be provided to the user.

[Display Methods of 3D Televisions]

For the display panel of the 3D television 206, there are various types of panels including a plasma display panel (PDP) type using plasma, a liquid crystal display (LCD) type using liquid crystal, and a microPol type, which is a kind of LCD type.

First, there will be described the operating principle of an LCD-type panel. An LCD-type panel is implemented by using molecules called liquid crystal of which the directions are changed by applying voltage thereto. The LCD type changes the voltage applied to liquid crystal molecules to control the directions of the molecules and control the transmittance of the light from the backlight, thereby displaying an image. As LCD-type display panels, there are a "normally white" type that transmits the light from the backlight when no voltage is applied to the liquid crystal molecules and a "normally black" type that blocks the light from the backlight when no voltage is applied to the liquid crystal molecules, which are differentiated by the polarization directions of polarizing sheets applied to the front and back of the display panel.

On an LCD-type display panel, image display is generally renewed by performing scanning line by line. For example, a renewal starts from the top line on a display panel 2, and the pixel condition is renewed by performing scanning in the vertical direction until reaching the bottom line on the display panel. Accordingly, if left and right parallax images are alternately renewed one by one, a left parallax image and a right parallax image will be mixed during the renewal. Also, since a response from liquid crystal requires a time, a time difference will occur between the time when a signal directing pixel renewal is received and the time when the pixel renewal is actually performed.

If a left parallax image and a right parallax image are mixed together when the left eye shutter of the shutter glasses 210 is opened, the user cannot correctly see the left-eye image with the left eye. The same situation will occur for the right eye. Accordingly, for an LCD-type display panel, the operation of "frame repetition" by which each of left and right parallax images is displayed twice successively or "black insertion" by which a single-colored frame, such as an all-black frame, is displayed between a left parallax image and a right parallax image may be performed.

Figure 4:
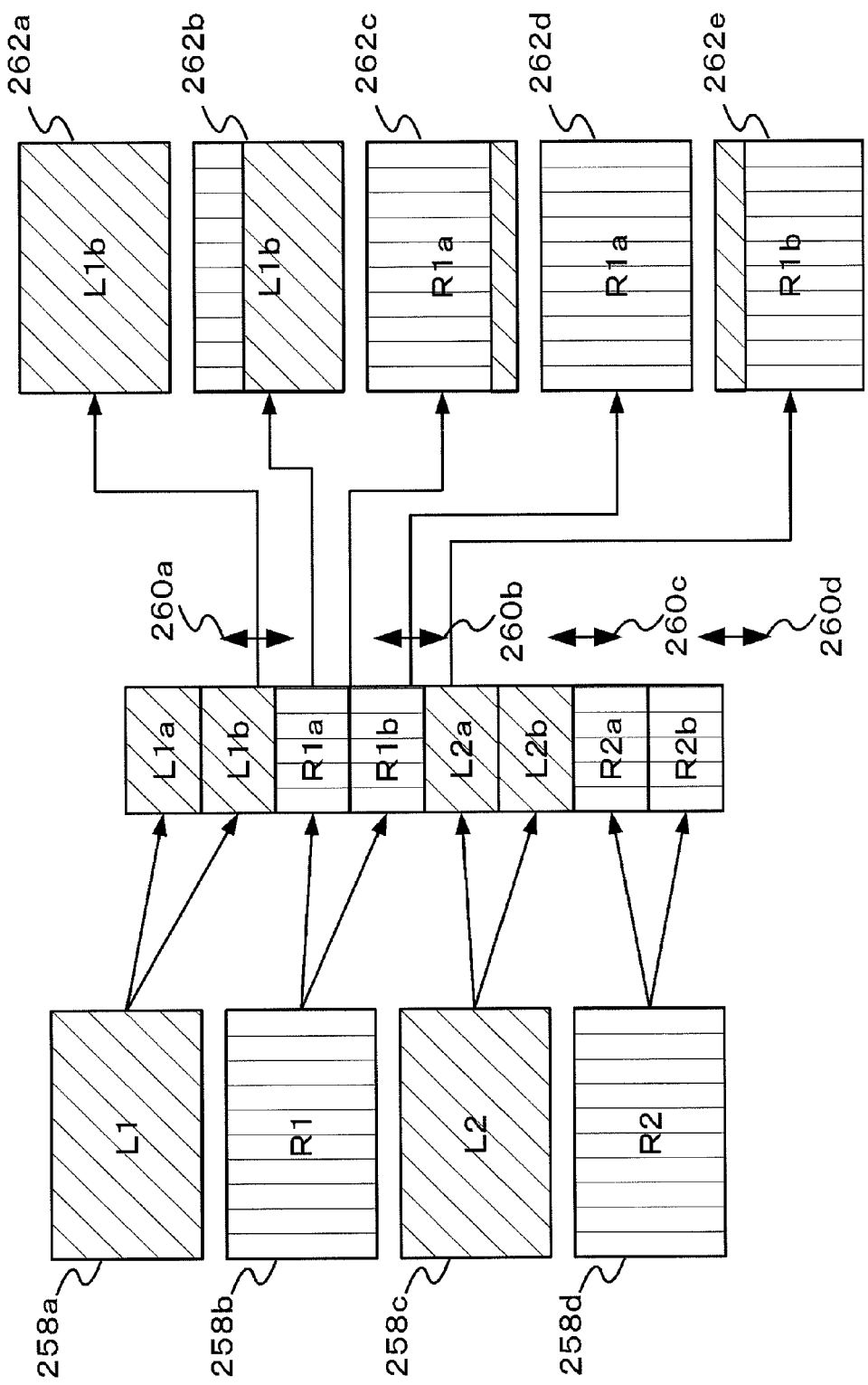
FIG. 4 is a diagram for describing an image display method of a 3D liquid crystal television.

FIG. 4 is a diagram for describing an image display method of a 3D liquid crystal television. FIG. 4 shows the "frame repetition" mentioned above. In the figures, parallax images to be displayed are collectively denoted by the reference numeral 258. Also, a parallax image for the left eye is denoted by L (initial letter of Left), and a parallax image for the right eye is denoted by R (initial letter of Right). Further, parallax images actually displayed on the display panel are collectively denoted by the reference numeral 262. In the figures, a left-eye parallax image is hatched with diagonal lines, whereas a right-eye parallax image is hatched with vertical lines.

A left-eye parallax image 258a is rendered twice on the display panel. In FIG. 4, L1a denotes the first rendering of the left-eye parallax image 258a, and L1b denotes the second rendering thereof. In the same way, R1a denotes the first rendering of the right-eye parallax image 258b, and R1b denotes the second rendering thereof. The same definition applies to L2a, L2b, R2a, and R2b.

Since the image is renewed by performing scanning line by line as mentioned previously, the image L1b remains on the display panel when the rendering of R1a is started. The image 262b shows the display image on the display panel at the time. Further, since a response from liquid crystal requires a time, a time difference will occur between the time when a signal directing pixel renewal is received and the time when the pixel renewal is actually performed, as also stated previously. Accordingly, even when all the rendering signals for R1a have been received, the display panel does not completely display R1 yet. The image 262c shows the display image on the display panel at the time.

Since the response time of liquid crystal elapses while R1b is rendered, the rendering of the lower part of the image, which was not completed in the image 262c, is completed and the whole R1 is displayed on the display panel, as shown by the image 262d. Accordingly, the shutter glasses 210 close the left eye shutter and open the right eye shutter while the whole R1 is displayed on the display panel. The corresponding period is indicated by the reference numeral 260b in FIG. 4. For a similar reason, the right eye shutter is closed and the left eye shutter is opened during the periods indicated by the reference numerals 260a and 260c. Also, the left eye shutter is closed and the right eye shutter is opened during the period indicated by the reference numeral 260d. During the periods other than the periods indicated by the reference numeral 260, the shutter glasses 210 close both the shutters.

Thus, in the "frame repetition" method, each of left and right parallax images is displayed twice successively to ensure a period for fully displaying a left or right parallax image on the display panel, and such a period is synchronized with the timing of opening or closing a shutter of the shutter glasses 210, so that appropriate parallax images are projected into human eyes.

Figure 5:
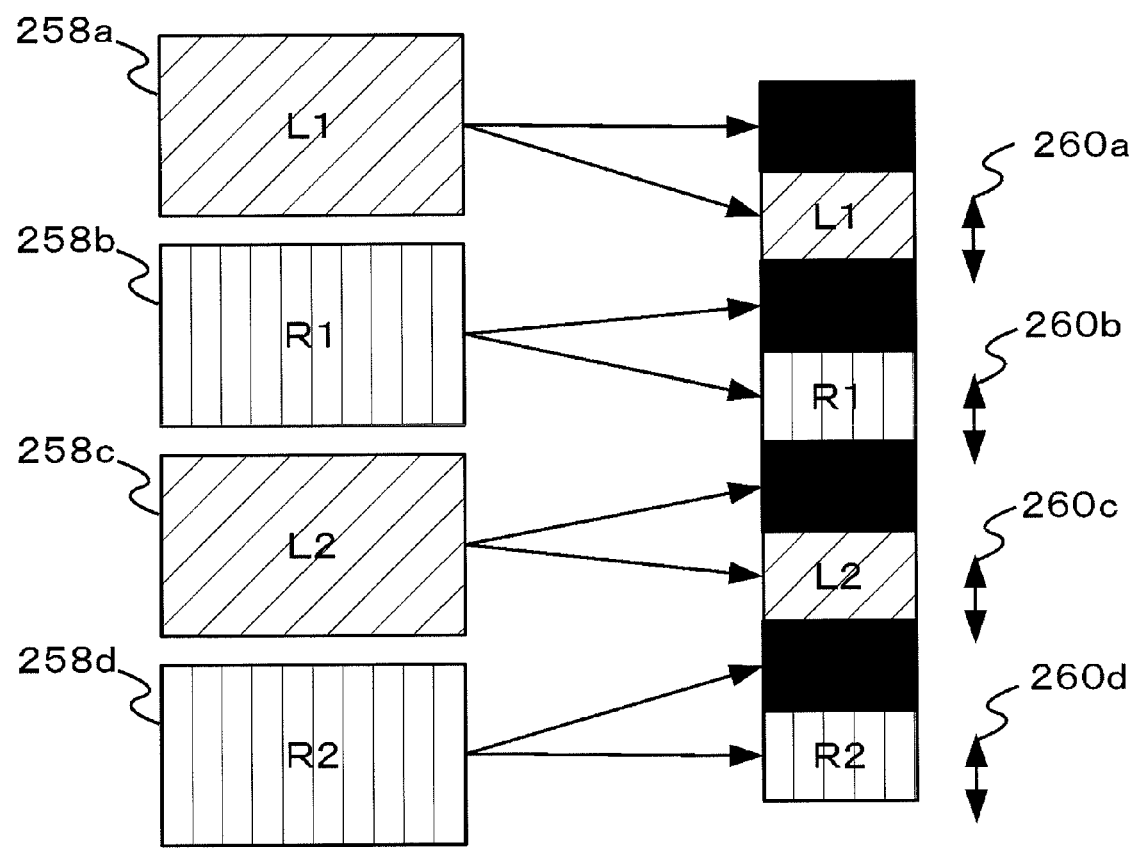
FIG. 5 is a diagram for describing another image display method of a 3D liquid crystal television.

FIG. 5 is a diagram for describing another image display method of a 3D liquid crystal television. FIG. 5 shows the "black insertion" mentioned previously. Since an image is rendered by performing scanning on an LCD-type display panel and there is a response time of liquid crystal, during the renewal to a parallax image 258, the previous parallax image 258 is mixed therein on the panel, as described previously. Accordingly, a black image is inserted between a left-eye parallax image 258a and a right-eye parallax image 258b. Although a parallax image 258 and a black image are mixed together accordingly, it merely causes a reduction in the overall luminance of the parallax image 258 and the configuration of the parallax image is maintained.

In order to display a left parallax image and a right parallax image, the display panel need be driven twice each in both the "frame repetition" method shown in FIG. 4 and the "black insertion" method shown in FIG. 5. Therefore, in order to display a stereoscopic picture with a frame rate n [Hz], for example, the display panel need be driven at quadruple the frame rate, as expressed by the following formula.

$$n \text{ [Hz]} \times 2 \text{ (frame repetition or black insertion)} \times 2 \text{ (left and right parallax images)} = 4n \text{ [Hz]}$$

Next, there will be described the operating principle of a microPol-type panel. A microPol-type panel is also a kind of type using liquid crystal but provides stereoscopic pictures according to an operating principle different from that of the type shown in FIG. 4 or 5.

Figure 6:
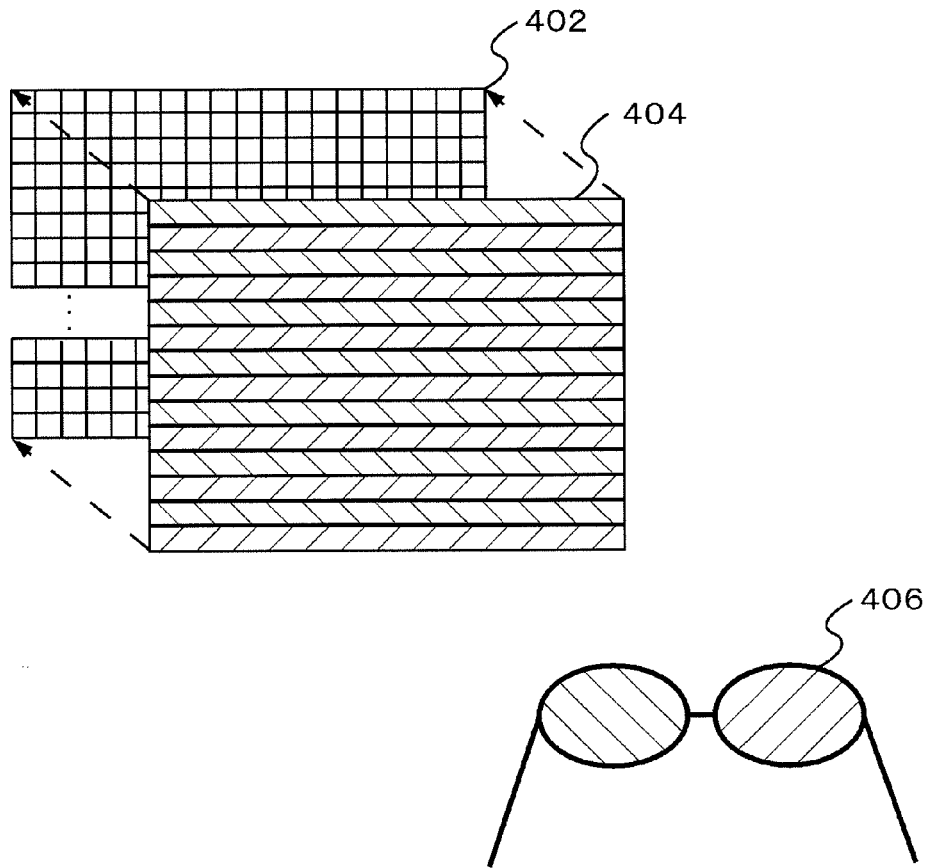
FIG. 6 is a diagram for describing the display principle of a microPol-type 3D television.

FIG. 6 is a diagram for describing the display principle of a microPol-type 3D television. In a microPol-type 3D television, a polarizing sheet 404 is applied to the surface of a liquid crystal panel 402. The polarizing sheet 404 is applied so that the polarization directions of odd-numbered lines and even-numbered lines counted from the top of the polarizing plate are different therein. Glasses 406 for the microPol type are polarized glasses. In the glasses 406 for the microPol type, the polarization direction of the left eye lens is set so that light passing through the odd-numbered lines in the liquid crystal panel can be seen through the lens, whereas the polarization direction of the right eye lens is set so that light passing through the even-numbered lines in the liquid crystal panel can be seen through the lens.

The liquid crystal panel 402 displays a parallax image for the left eye on the odd-numbered lines and displays a parallax image for the right eye on the even-numbered lines of the panel. When a user views the liquid crystal panel 402 wearing the glasses 406 for the microPol type, a parallax image for the left eye is projected into the user's left eye and a parallax image for the right eye is projected into the user's right eye. Therefore, the user can view a stereoscopic picture. A microPol-type panel provides left and right parallax images at the same time by alternately rendering the images line by line through the liquid crystal panel, instead of providing left and right parallax images in a time-division manner.

On a microPol-type panel, each of a left-eye parallax image and a right-eye parallax image to be projected into user's eyes appears on every other line. Accordingly, a nearly-horizontal line, for example, is severed and tends to appear as a stair-like jagged line (so-called jaggies).

Lastly, the operating principle of a PDP-type panel will be briefly described. The PDP type is a kind of flat panel display type, which uses ultraviolet light caused by discharge to excite red, blue, and green phosphor layers to emit light. A PDP-type panel controls the brightness of image display or the gradation of the image with the number of discharge processes. For example, a pixel for which no discharge is performed looks black, and the larger the number of discharge processes for a pixel, the more the brightness thereof increases. Such operations are possible because the PDP type uses discharge, so that response time required for the operation of allowing pixels constituting the panel to emit light or blacken is considerably short, such as a few microseconds.

[Crosstalk on an LCD-type Panel]

There will now be described a phenomenon called "crosstalk" that is likely to occur when a stereoscopic picture is displayed on an LCD-type display panel. Crosstalk is a phenomenon by which, when a user views a stereoscopic picture, the picture looks as if images overlap in layers because part of a parallax image for the left eye is provided to the right eye or because a parallax image for the right eye is provided to the left eye, for example. Although crosstalk also occurs on a PDP-type panel when the timing of closing a shutter of the shutter glasses 210 does not coincide with the timing of image display, in the following will be described causes of crosstalk unique to the operating principle of the LCD type.

As described previously, the LCD type changes the voltage applied to liquid crystal molecules to control the directions of the molecules and control the transmittance of the light from the backlight. Since the liquid crystal molecules are relatively large, a time is required to move the molecules. It is said that a response time from when a given voltage is applied to liquid crystal molecules until when the direction of the liquid crystal molecules moves to a desired direction is about 4 to 10 milliseconds.

There is a technique of applying increased voltage to liquid crystal so as to improve the response speed, called "overdrive," but the technique cannot be used when the direction of the liquid crystal molecules is returned from the state where a voltage is applied to the molecules to the state where no voltage is applied thereto. Therefore, improving response speed of an LCD-type panel is a difficult problem.

An LCD-type panel alternately displays parallax images for the left eye and parallax images for the right eye in a time-division manner, as described with reference to FIGS. 4 and 5. In the case of black insertion, for example, a single-colored image with relatively low luminance is inserted between two images. Accordingly, when a parallax image contains a high-luminance region, liquid crystal molecules may not be able to respond to the switching of images, so that an image that actually should not be displayed may appear.

Also, when the display panel is the normally black type and the display method of black insertion is employed therein, crosstalk is likely to occur in a high-luminance region of a parallax image for the same reason as stated above. On the other hand, when the display panel is the normally black type and the display method of frame repetition is employed therein, crosstalk is likely to occur in a low-luminance region of a parallax image. Since a normally black type panel blocks the light from the backlight most when the lowest voltage is applied to the liquid crystal molecules, a technique such as overdrive cannot be used to put the panel into the state where the light from the backlight is blocked, so that a longer response time is required. Thus, with regard to the LCD type, the tendency of the luminance value with which crosstalk is likely to occur is different depending on the panel type and the display method.

[Three-dimensional Picture Reproducing Apparatus]

Figure 7:
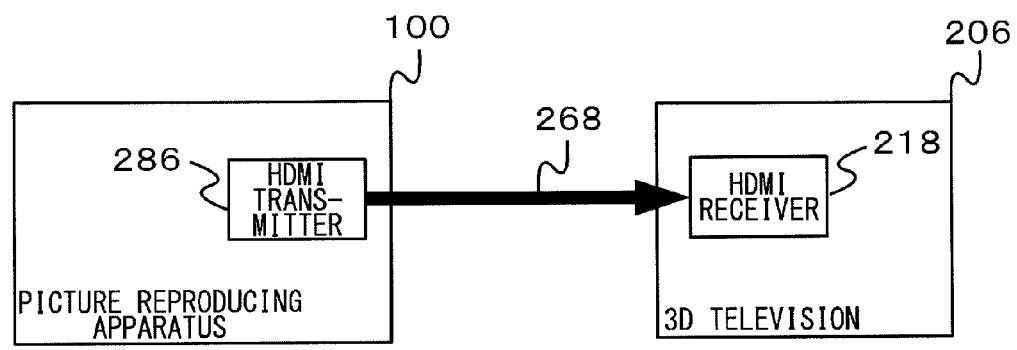
FIG. 7 is a diagram that schematically shows a device configuration of a 3D picture display system according to an embodiment.

FIG. 7 is a diagram that schematically shows a device configuration of the 3D picture display system 300 according to an embodiment. Devices used in the 3D picture display system 300 include a picture reproducing apparatus 100 and a 3D television 206. The picture reproducing apparatus 100 includes an HDMI transmitter (HDMI Tx) 286, which communicates with an HDMI receiver (HDMI Rx) 218 of the 3D television 206 via an HDMI cable 268 and will be described later.

Figure 8:
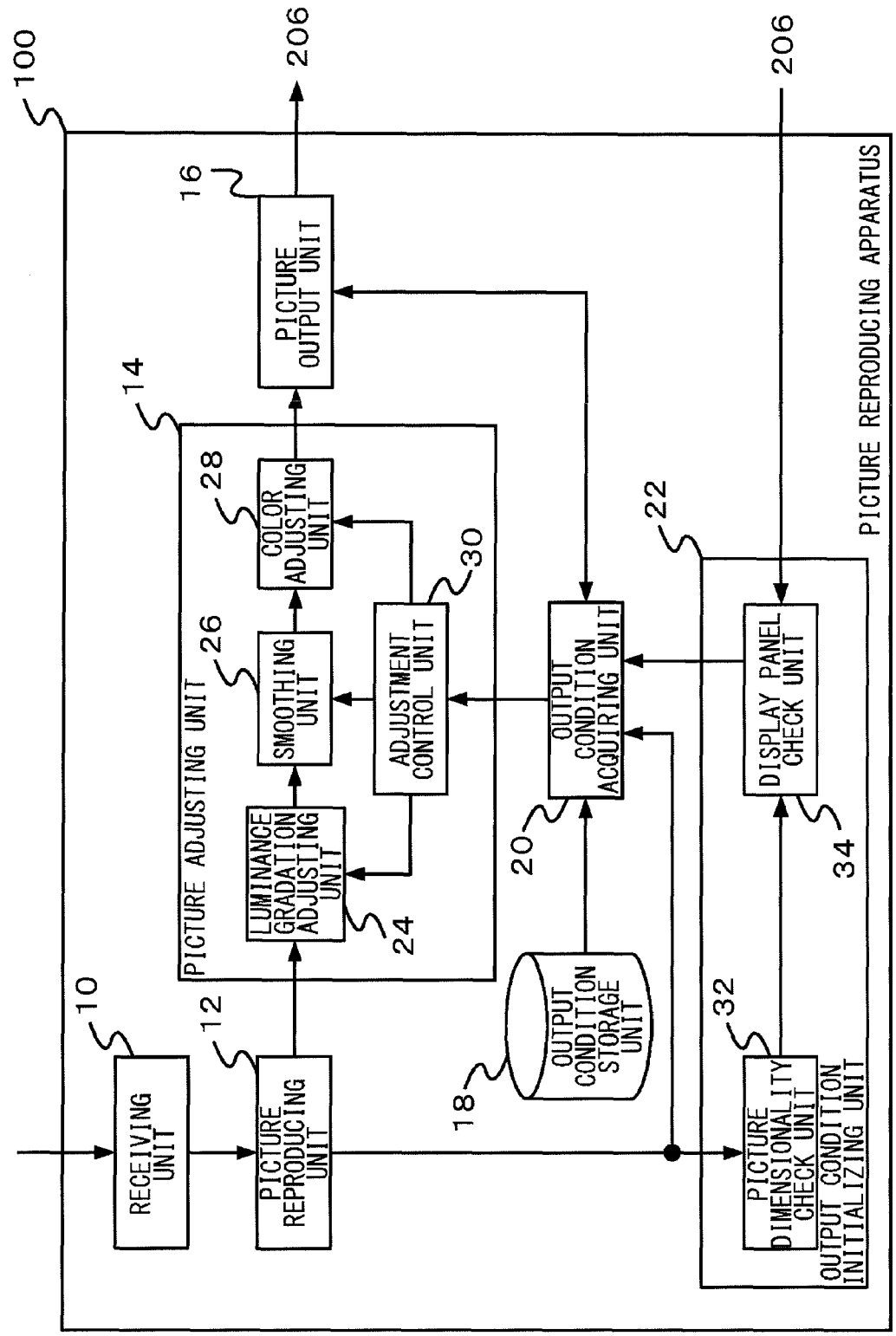
FIG. 8 is a diagram that schematically shows a functional configuration of a 3D picture reproducing apparatus according to the embodiment.

FIG. 8 is a diagram that schematically shows a functional configuration of the picture reproducing apparatus 100 according to the embodiment. The picture reproducing apparatus 100 comprises a receiving unit 10, a picture reproducing unit 12, a picture adjusting unit 14, a picture output unit 16, an output condition storage unit 18, an output condition acquiring unit 20, and an output condition initializing unit 22.

The receiving unit 10 receives a user's instruction directed to the picture reproducing apparatus 100. The picture reproducing unit 12 reproduces a picture stored in a Blu-ray Disc (trademark) or the like.

The output condition initializing unit 22 initializes picture output conditions based on the type of the picture reproduced by the picture reproducing unit 12 and extended display identification data (EDID) acquired from the 3D television 206. The "picture output conditions" mean conditions regarding the ranges of luminance values and colors specified for a picture and are set to prevent the occurrence of crosstalk. The picture output conditions include a condition defining whether or not to set the ranges of luminance values and colors for a picture to "standard settings," which will be described later. Accordingly, the output condition initializing unit 22 includes a picture dimensionality check unit 32 and a display panel check unit 34.

The picture dimensionality check unit 32 checks whether a picture reproduced by the picture reproducing unit 12 is a general two-dimensional picture or a stereoscopic picture including parallax images for the left eye and the right eye. The display panel check unit 34 acquires the check result from the picture dimensionality check unit 32. The EDID retained by the 3D television 206 according to the present embodiment includes information regarding the type and display method of the panel. Accordingly, when the picture reproduced by the picture reproducing unit 12 is a stereoscopic picture, the display panel check unit 34 acquires the EDID from the 3D television 206 to check the type and display method of the display panel.

Based on the information acquired by the display panel check unit 34, the output condition acquiring unit 20 retrieves, from the output condition storage unit 18 described later, one or more picture output conditions suitable for the display characteristics of the display panel. The output condition acquiring unit 20 then provides the output conditions retrieved from the output condition storage unit 18 on the display panel of the 3D television 206 via the picture output unit 16 in a manner such that the output conditions are selectable and acquires a selection from the user. Such an operation is enabled using on-screen display (OSD) or another display technique, for example.

The output condition storage unit 18 includes a database in which types and display methods of display panels are related to picture output conditions. FIG. 9 is a diagram that schematically shows a data structure in the output condition storage unit 18. The data structure of the output condition storage unit 18 differs depending on whether the display device is liquid crystal or another device such as plasma. As mentioned previously, crosstalk is less likely to occur on a PDP-type panel in principle because of its fast response speed for display. Accordingly, for the case where the display device is plasma or the like, the luminance range is set to be wide and the γ (gamma) value regarding gradation is set to a standard value of 2.2. Also, the character color used for OSD is set to white (namely, each of the values of R, G, and B, which indicate the luminous intensities of red, green, and blue, respectively, is set to the maximum value of 255), and the background therefor is set to black. The above-mentioned output conditions for a plasma device or the like are regarded as standard settings.

When the display panel is a liquid crystal display panel, the data structure of the output condition storage unit 18 is classified into three types depending on the device's property, i.e., normally black, normally white, or microPol. Since a microPol-type panel does not provide parallax images in a time-division manner, crosstalk is less likely to occur in principle. Accordingly, standard output conditions as specified for a plasma device or the like are set for the microPol type. However, since jaggies are likely to occur in the horizontal direction on a microPol-type panel, as stated previously, an output condition of applying a smoothing filter process in the vertical direction on a picture is specified as a countermeasure thereto.

When the display panel is the normally black type and the display method of frame repetition is employed therein, crosstalk is likely to occur in a low-luminance region of a parallax image. Accordingly, output conditions for the normally black type are set to be a higher luminance range of the standard gradation settings specified for a plasma device or the like. On the other hand, when the display panel is the normally white type, or when the display panel is the normally black type and the display method of black insertion is employed therein, crosstalk is likely to occur in a high-luminance region of a parallax image. Accordingly, output conditions for such a case are set to be a lower luminance range of the standard gradation settings specified for a plasma device or the like.

There is a case where the display panel is the normally black type but an inserted image has luminance, i.e., the value of red, blue, or green of each pixel constituting an inserted image is not zero. In such a case, output conditions may be set so that the gradation is compressed with the luminance value of the inserted image centered. Since such an inserted image has a low luminance value, output conditions for this case are also set to be a lower luminance range of the standard gradation settings specified for a plasma device or the like.

FIG. 10 is an exemplary display for prompting selection of a luminance value range of a 3D liquid crystal television 206. This screen is displayed on the display panel of the 3D liquid crystal television 206 using the OSD technique, and a user can select a luminance value range according to the user's preference. The option corresponding to the output condition acquired by the output condition acquiring unit 20 from the output condition storage unit 18 may be emphatically displayed, such as being displayed in a different color, although such an example is not illustrated in the figures. Such a method has the advantage that the user can easily select a picture output condition suitable for the display characteristics of the display panel.

FIG. 11 is an exemplary display for prompting selection of gradation settings of the 3D liquid crystal television 206. In the same way as the case of selecting a luminance value range in FIG. 10, the screen is displayed on the display panel of the 3D liquid crystal television 206 using the OSD technique, and a user can select gradation settings according to the user's preference. Further, FIG. 12 is an exemplary display for prompting selection of the level of a smoothing process for the microPol type. A user can select the level of a smoothing process according to the user's preference.

A change in gradation characteristics of the display device will affect the color and contrast of the image. Some users may wish to view a picture in which the colors and contrasts of images are maintained, even though crosstalk would occur. The likelihood of crosstalk differs also depending on the genre of the displayed picture. For example, it is said that a computer graphics (CG) picture as seen in a game shows the contours, colors, and contrast therein more clearly, so that the problem of crosstalk would be more serious. When picture output conditions are provided in such a manner as to be selectable by a user, as shown in FIGS. 10 through 12, an advantage is obtained such that a balance between the hue or gradation and the prevention of crosstalk can be controlled.

The description now returns to FIG. 8, and the picture adjusting unit 14 adjusts a picture reproduced by the picture reproducing unit 12 based on a user's selection acquired from the output condition acquiring unit 20. Accordingly, the picture adjusting unit 14 includes a luminance gradation adjusting unit 24, a smoothing unit 26, a color adjusting unit 28, and an adjustment control unit 30.

The adjustment control unit 30 acquires a user's selection from the output condition acquiring unit 20. The luminance gradation adjusting unit 24 then adjusts the overall luminance and gradation of the picture reproduced by the picture reproducing unit 12 according to an instruction from the adjustment control unit 30. More specifically, the luminance gradation adjusting unit 24 specifies the upper limit and lower limit of the luminance value so that the luminance value of the picture reproduced by the picture reproducing unit 12 falls within a predetermined luminance value range, and the unit 24 also specifies an offset and a gamma value regarding gradation. The luminance gradation adjusting unit 24 compresses a luminance range by compressing each of the luminance ranges of red, green, and blue of each pixel constituting the picture reproduced by the picture reproducing unit 12.

The smoothing unit 26 performs a smoothing process in the vertical direction on a picture output by the luminance gradation adjusting unit 24 according to an instruction from the adjustment control unit 30. Accordingly, jaggies in the horizontal direction, which are likely to occur on a microPol-type panel, can be reduced. The color adjusting unit 28 adjusts the color of a subtitle or OSD to be superimposed on a picture output by the smoothing unit 26 according to an instruction from the adjustment control unit 30. By displaying the OSD or subtitle in a color with which crosstalk is less likely to occur, crosstalk can be reduced. The picture output unit 16 outputs the picture adjusted by the picture adjusting unit 14 to the 3D television 206.

As the subtitles or OSD adjusted by the color adjusting unit 28, the following items can be considered in addition to the menu display as shown in FIG. 10, 11, or 12. That is, closed captions on general two-dimensional pictures, character data according to ARIB (Association of Radio Industries and Businesses), subtitles or menus included in three-dimensional contents in Blu-ray Discs (trademark), and BD-J {Blu-ray Disc Java (Java is a registered trademark)}.

The Blu-ray Disc (trademark) standards define several methods for rendering subtitles or OSD for three-dimensional contents. In the case of presentation graphics and interactive graphics, which are subtitles and menus configured with a color palette and run-length encoded bitmap data, a color palette and image data compressed through run-length encoding are stored in a disc. Accordingly, the color adjusting unit 28 may be capable of compressing the range of colors in the color palette or retaining data of multiple color palettes so as to select a palette to use according to the type of the 3D television 206 conveyed by the adjustment control unit 30.

In the case of text subtitles, which are character strings of which the colors are specified, character strings to be displayed and output conditions regarding character colors are stored in a disc. Accordingly, the color adjusting unit 28 adjusts character colors according to the type of the 3D television 206 conveyed by the adjustment control unit 30 before outputting the data.

In the case of directly rendering a text or menu using a BD-J program, the type of the 3D television 206 is acquired from the color adjusting unit 28 and character colors are adjusted accordingly by the BD-J program. Alternatively, the color adjusting unit 28 may acquire output conditions regarding character colors according to the type of the 3D television 206, and character colors may be then adjusted based on the output conditions using the BD-J program. Such a BD-J program is executed by a CPU provided in the picture reproducing apparatus (not illustrated).

FIG. 8 shows a functional configuration for implementing the picture reproducing apparatus 100 according to the embodiment, and other configurations are omitted therein. Each of the elements represented by functional blocks for performing various processes shown in FIG. 8 can be implemented by a CPU, a main memory, an LSI or the like in terms of hardware, and by a program loaded into a main memory or the like in terms of software. Accordingly, it will be obvious to those skilled in the art that these functional blocks may be implemented in a variety of forms by hardware only, software only, or a combination thereof, and the form is not limited to any of them.

Figure 13:
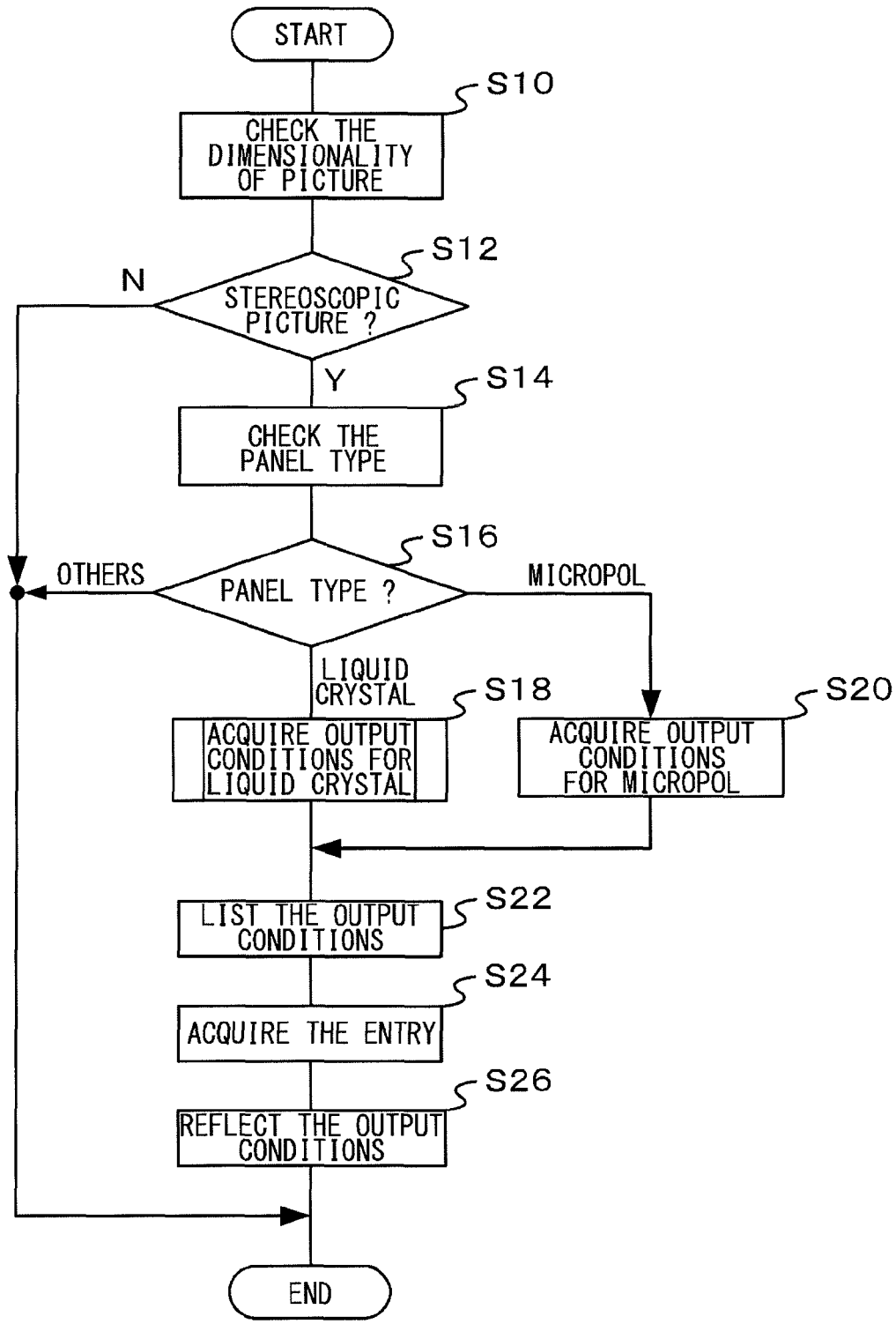
FIG. 13 is a flowchart that shows the procedure of picture display in the picture reproducing apparatus according to the embodiment.

FIG. 13 is a flowchart that shows the procedure of picture display in the picture reproducing apparatus 100 according to the embodiment. With regard to the flowchart, a procedure performed by each unit is denoted by a combination of the letter S, meaning a step (initial letter of Step), and a number. Also, when a determination process is performed in processing denoted by a combination of the letter S and a number, a case where the determination result is positive is expressed, for example, as (Y at S12) using the letter Y (initial letter of Yes). On the other hand, a case where the determination result is negative is expressed, for example, as (N at S12) using the letter N (initial letter of No). The process of this flowchart starts when the picture reproducing unit 12 reproduces a stereoscopic picture.

The picture dimensionality check unit 32 checks whether a picture reproduced by the picture reproducing unit 12 is a general two-dimensional picture or a stereoscopic picture including parallax images for the left eye and the right eye (S10). If the picture reproduced by the picture reproducing unit 12 is a stereoscopic picture (Y at S12), the display panel check unit 34 will acquire EDID from the 3D television 206 to check the type and display method of the display panel (S14). If it is determined that the type of the display panel is liquid crystal at the step S16, the output condition acquiring unit 20 will acquire output conditions for liquid crystal from the output condition storage unit 18 (S18). If it is determined that the type of the display panel is microPol at the step S16, the output condition acquiring unit 20 will acquire output conditions for microPol from the output condition storage unit 18 (S20).

Thereafter, the output condition acquiring unit 20 lists the output conditions retrieved from the output condition storage unit 18 on the display panel of the 3D television 206 via the picture output unit 16 in a manner such that the output conditions are selectable (S22). The output condition acquiring unit 20 then acquires a selection from the user (S24). Subsequently, the picture adjusting unit 14 adjusts the stereoscopic picture according to the output conditions acquired by the output condition acquiring unit 20 (S26). When the picture adjusting unit 14 has adjusted a stereoscopic picture, when the picture reproduced by the picture reproducing unit 12 is not a stereoscopic picture (N at S12), or when it is determined that the type of the display panel is the PDP type or another type at the step S16, the process of this flowchart terminates.

Figure 14:
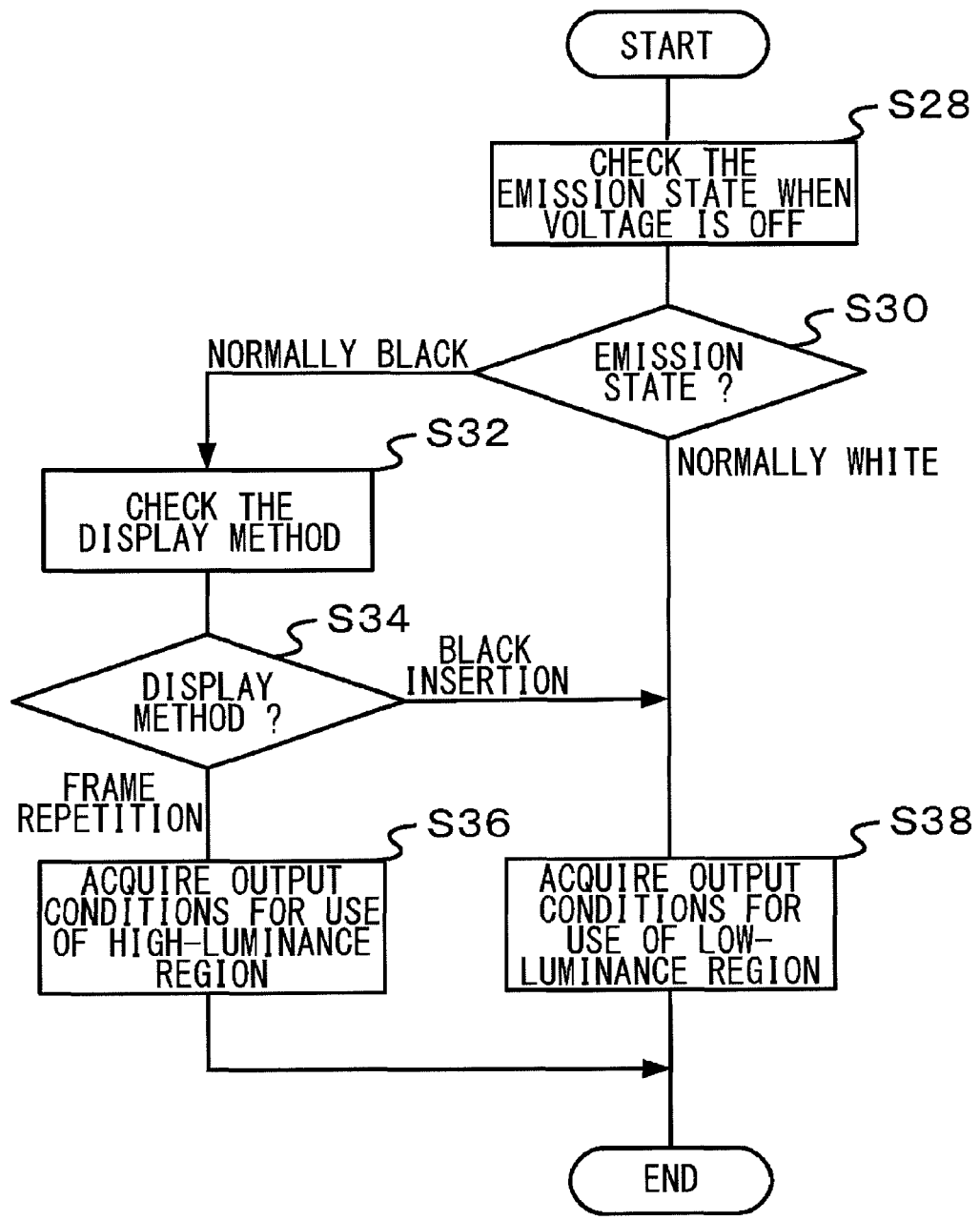
FIG. 14 is a flowchart that shows the procedure for determining the output conditions of the 3D liquid crystal television.

FIG. 14 is a flowchart that shows the procedure for determining the output conditions of the 3D liquid crystal television 206, and this figure details the step S18 in FIG. 13.

The output condition acquiring unit 20 checks the emission state of the panel when the voltage is turned off, based on information acquired from the display panel check unit 34 (S28). If it is determined that the emission state is normally black at the step S30, the output condition acquiring unit 20 will further check the display method for a stereoscopic picture based on the information acquired from the display panel check unit 34 (S32). If it is determined that the display method is frame repetition at the step S34, the output condition acquiring unit 20 will retrieve and acquire, from the output condition storage unit 18, output conditions for the case of using a high-luminance region (S36).

If it is determined that the emission state of the panel is normally white at the step S30, or if it is determined that the display method for a stereoscopic picture is black insertion at the step S34, the output condition acquiring unit 20 will retrieve and acquire, from the output condition storage unit 18, output conditions for the case of using a low-luminance region (S38).

As described above, according to the embodiment, a stereoscopic picture is provided according to output conditions suitable for a television used by a user, thereby preventing crosstalk on the stereoscopic picture. Also, settings for preventing crosstalk are provided in such a manner as to be selectable by a user, thereby enabling picture transformation according to the user's preference.

The present invention has been described with reference to the embodiment. The embodiment is intended to be illustrative only, and it will be obvious to those skilled in the art that various modifications to constituting elements or processes could be developed and that such modifications also fall within the scope of the present invention.

[Modifications of the Embodiment]

Figure 15:
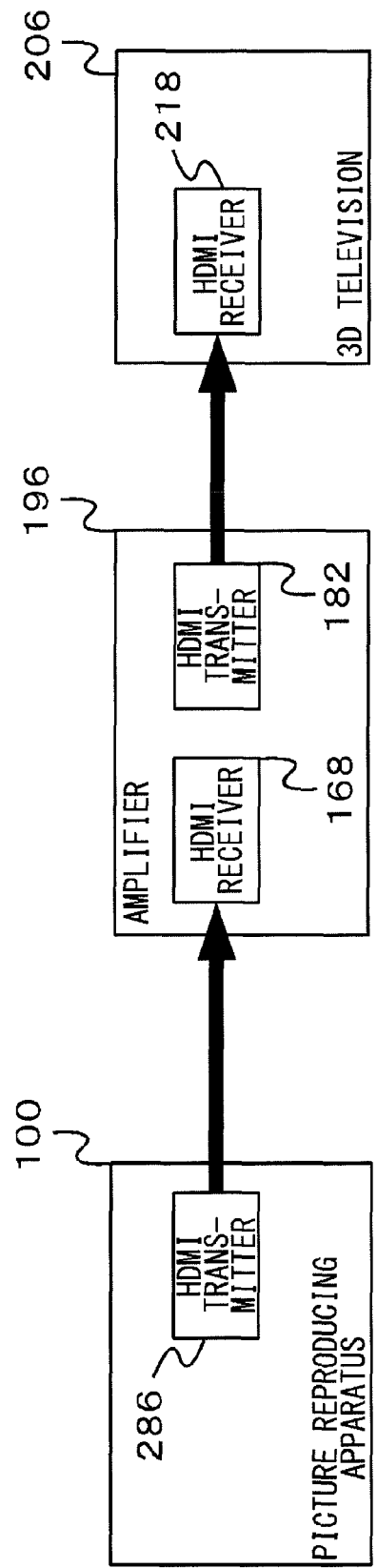
FIG. 15 is a diagram that schematically shows another device configuration of the 3D picture display system according to the embodiment.

FIG. 15 is a diagram that schematically shows another device configuration of the 3D picture display system 300 according to the embodiment. Devices used in the 3D picture display system 300 of this example include the picture reproducing apparatus 100, an amplifier 196, and a 3D television 206. The picture reproducing apparatus 100 includes the HDMI transmitter (HDMI Tx) 286 and communicates with the amplifier 196 via an HDMI cable 268a. Meanwhile, the 3D television 206 also communicates with the amplifier 196 via an HDMI cable 268b. Accordingly, the amplifier 196 includes an HDMI receiver 168 and an HDMI transmitter 182.

Although signals of pictures or audio output from the picture reproducing apparatus 100 are directly input to the 3D television 206 in the example of FIG. 7, such signals are processed by the amplifier 196 in this example before being input to the 3D television 206. This provides an effect of performing more advanced processing on audio signals than the processing performed in the picture reproducing apparatus 100 or 3D television 206.

In the above description, picture adjustment including luminance adjustment is performed by the picture reproducing apparatus 100 or amplifier 196. However, if the 3D television 206 is capable of performing such picture adjustment, the picture reproducing apparatus 100 or amplifier 196 may transmit a picture to the 3D television 206 without performing picture adjustment thereon. In such a case, the display panel check unit 34 acquires EDID from the 3D television 206 and analyzes the data. Consequently, if a flag is set indicating that picture signal processing is unnecessary, for example, the picture reproducing apparatus 100 or amplifier 196 will not perform picture signal processing. Since the 3D television 206 itself adjusts the picture, the picture adjustment will be more suitable for the 3D television 206, providing the advantage that a user can view the picture with higher image quality.

Alternatively, if EDID acquired from the 3D television 206 includes a flag indicating that picture adjustment is unnecessary, the fact may be presented to the user so that the user can select one or more apparatuses to use for picture adjustment from among the picture reproducing apparatus 100, amplifier 196, and 3D television 206.

When the user has decided to have the amplifier 196 perform picture signal processing, there may be a case where a control signal input from the 3D television 206 to the amplifier 196 includes a flag indicating that picture signal processing should be performed by the 3D television 206. In such a case, the amplifier 196 may clear, from the control signal input thereto, the flag indicating that picture signal processing should be performed by the 3D television 206.

In the present embodiment, after the luminance value range for a stereoscopic picture to be output to the 3D television 206 is compressed according to the characteristics of the 3D television 206, a smoothing process is performed if necessary. Thereafter, a subtitle or OSD of which the display color is adjusted according to the characteristics of the 3D television 206 is superimposed on the acquired stereoscopic picture. Accordingly, when some processing will need be performed on a subtitle or OSD superimposed on a stereoscopic picture on the 3D television 206, the picture reproducing apparatus 100 or amplifier 196 should preferably not superimpose the subtitle or OSD on the stereoscopic picture. It is because separating a subtitle or OSD superimposed on a stereoscopic picture may be sometimes difficult in the 3D television 206.

Although adjustment of a stereoscopic picture has been mainly described in the above, the techniques may be applied to a conventional two-dimensional picture. Such application is enabled by storing output conditions for a two-dimensional picture in the output condition storage unit 18. This provides the advantage that, besides stereoscopic pictures, conventional two-dimensional pictures can also be provided according to picture output conditions suitable for the characteristics of the display panel.

What is claimed is:

1. A picture reproducing method comprising:
   acquiring, from a display apparatus implemented by a liquid crystal television by which a three-dimensional picture is displayed on a glasses-based stereoscopic display panel, information including a type of panel system of the display panel, the three-dimensional picture containing a first parallax image and a second parallax image, which are images of an object from different points of view in a three-dimensional space;
   determining, using the type of panel system of the display panel, a method of parallax required for display of the three-dimensional picture by glasses of the display panel;
   retrieving from a database an appropriate picture output conditions for correcting crosstalk of the three-dimensional picture as viewed by the glasses of the display panel, wherein the appropriate picture output condition is retrieved using the method of parallax required for display of the three-dimensional picture;
   listing the retrieved picture output conditions for correcting crosstalk on the display panel in such a manner so as to be selected by a user; and
   displaying the three-dimensional picture by correcting the three-dimensional picture using the selected picture output conditions.

2. The picture reproducing method of claim 1, wherein, when the display panel is a liquid crystal-type display, the emission state of the display panel is determined when voltage is not supplied to the display panel, and, if the display panel is a normally white-type panel when voltage is not supplied, the picture output condition for viewing the three-dimensional picture with the glasses is set within a narrower gradation range within a standard gradation setting for a liquid crystal display, with the narrower gradation range set so that it encompasses the lowest luminance of the setting, and the output display condition is listed on the display panel in such a manner so as to be selected by the user.

3. The picture reproducing method of claim 2, wherein a color of an on-screen display (OSD) or subtitle suitable for the display panel are retrieved from a database on the basis of acquired information including the type of display panel, and the acquired information is listed as the picture output condition on the display panel in such a manner so as to be selected by the user.

4. The picture reproducing method of claim 1, wherein, when the display panel is a liquid crystal-type display, the emission state of the display panel is determined when voltage is not supplied to the panel, and, if the panel is normally black-type panel when voltage is not supplied, the method of parallax display is further determined, and,
   if the method of parallax display of the glasses of the display panel is a frame repetition method in which a same frame is displayed twice, the picture output condition for displaying the three-dimensional picture is set within a narrower gradation range within the standard gradation setting of a liquid crystal display, with the narrower gradation range set so that it encompasses the highest luminance of the setting, or,
   if the method of parallax display of the glasses of the display panel is a black-insertion method in which a single-colored image is inserted in between two images, the picture output condition for displaying the three-dimensional picture is set within a narrower gradation range within the standard gradation setting for the liquid crystal display panel, with the narrower gradation range set to the middle of the setting, and wherein
   the picture output condition is listed on the display panel in such a manner so as to be selected by the user.

5. The picture reproducing method of claim 4, wherein a color of an on-screen display (OSD) or subtitle suitable for the display panel are retrieved from a database on the basis of acquired information including the type of display panel, and the acquired information is listed as the picture output condition on the display panel in such a manner so as to be selected by the user.

6. The picture reproducing method of claim 1, wherein, when the display panel is a microPol-type display panel, and, when performing a smoothing filter process on the three-dimensional picture in a vertical direction, the level of the smoothing filter process is listed as the picture output condition on the display panel in such a manner so as to be selected by the user.

7. The picture reproducing method of claim 6, wherein a color of an on-screen display (OSD) or subtitle suitable for the display panel are retrieved from a database on the basis of acquired information including the type of display panel, and the acquired information is listed as the picture output condition on the display panel in such a manner so as to be selected by the user.

8. A picture reproducing apparatus, comprising:
   a picture-dimensionality check unit configured to check whether or not a picture to be reproduced is a three-dimensional picture containing a first parallax image and a second parallax image, which are images of an object from different points of view in a three-dimensional space;
   a display panel check unit configured to acquire, from a display apparatus implemented by a liquid crystal television by which the picture is displayed on a glasses-based stereoscopic display panel, information including a type of panel system of the display panel and configured to determine, using the type of panel system of the display system, a method of parallax required for display of the picture by glasses of the display panel on the condition that the picture to be reproduced is a three-dimensional picture; and a picture adjusting unit configured to retrieve from a database an appropriate picture output condition for correcting crosstalk of the three-dimensional picture as viewed by the glasses of the display panel, wherein the appropriate output condition is retrieved using the method of parallax required for display of the three-dimensional picture, to list the picture output conditions for correcting crosstalk on the display panel in such a manner so as to be selected by a user, and to adjust the picture in accordance with the selected picture output condition.

9. A non-transitory computer readable medium encoded with a program, the program comprising:
   a module configured to check whether or not a picture to be reproduced is a three-dimensional picture containing a first parallax image and a second parallax image, which are images of an object from different points of view in a three-dimensional space;
   a module configured to acquire, from a display apparatus implemented by a liquid crystal television by which the three-dimensional picture is displayed on a glasses-based stereoscopic display panel, information including a type of panel system of the display panel and configured to determine, using the type of panel system of the display screen, a method of parallax required for display of the picture by glasses of the display panel on the condition that the picture to be reproduced is a three-dimensional picture; and
   a module configured to retrieve from a database an appropriate picture output condition for correcting crosstalk of the three-dimensional picture as viewed by the glasses of the display panel, wherein the appropriate output condition is retrieved using the method of parallax required for display of the three-dimensional picture, to list the picture output conditions for correcting crosstalk on the display panel in such a manner so as to be selected by a user, and to adjust the picture in accordance with the selected picture output condition.

* * * * *